United States Patent [19]
Hori

[11] Patent Number: 5,986,687
[45] Date of Patent: Nov. 16, 1999

[54] LASER SCAN BASED RECORDING APPARATUS

[75] Inventor: Nobuyuki Hori, Tokyo, Japan

[73] Assignee: Asahi Kogaku Kogyo Kabushiki Kaisha, Tokyo, Japan

[21] Appl. No.: 08/966,805

[22] Filed: Nov. 10, 1997

[30] Foreign Application Priority Data

Nov. 11, 1996 [JP] Japan .................................. 8-298343

[51] Int. Cl.⁶ .................................................. H04N 1/405
[52] U.S. Cl. .......................... 347/246; 347/236; 347/249; 358/443
[58] Field of Search .................................. 347/236, 237, 347/246, 247, 250, 253, 249, 239; 358/474, 443; 455/76

[56] References Cited

U.S. PATENT DOCUMENTS

| | | | |
|---|---|---|---|
| 4,201,944 | 5/1980 | Beunders | 455/155.1 |
| 4,888,647 | 12/1989 | Wada | 358/474 |
| 5,001,341 | 3/1991 | Negishi | 250/235 |
| 5,136,160 | 8/1992 | Nakane et al. | 455/76 |
| 5,264,871 | 11/1993 | Tsukada | 347/253 |
| 5,461,414 | 10/1995 | Honda et al. | 347/250 |

FOREIGN PATENT DOCUMENTS

| | | |
|---|---|---|
| 5337029 | 4/1978 | Japan . |
| 4162013 | 6/1992 | Japan . |

*Primary Examiner*—N. Le
*Assistant Examiner*—Hai C. Pham
*Attorney, Agent, or Firm*—Greenblum & Bernstein

[57] ABSTRACT

The optical intensity of laser light from a laser diode of a laser scanning apparatus having a polygonal mirror is detected with a monitoring photodiode. The detected output is delivered to a first switching end of a selector. The optical intensity of laser light reflected from the polygonal mirror is detected with a photosensor and the detection output is delivered to a second switching end of the selector. The selector selects either one of the switching ends in accordance with the timing of a laser scan. The associated detection signal is fed to a comparator, where it is compared with a reference voltage to produce a comparison voltage, which in turn is fed to a laser drive circuit to control the emission output of the laser diode. Despite variation in the reflectance of laser light from each reflecting surface of the polygonal mirror, a constant optical intensity is obtained on the basis of the reference voltage. In addition, even if the photosensor fails to detect the laser light, laser power control is ensured by the monitoring of the photodiode to prevent the laser diode from being overdriven.

15 Claims, 5 Drawing Sheets

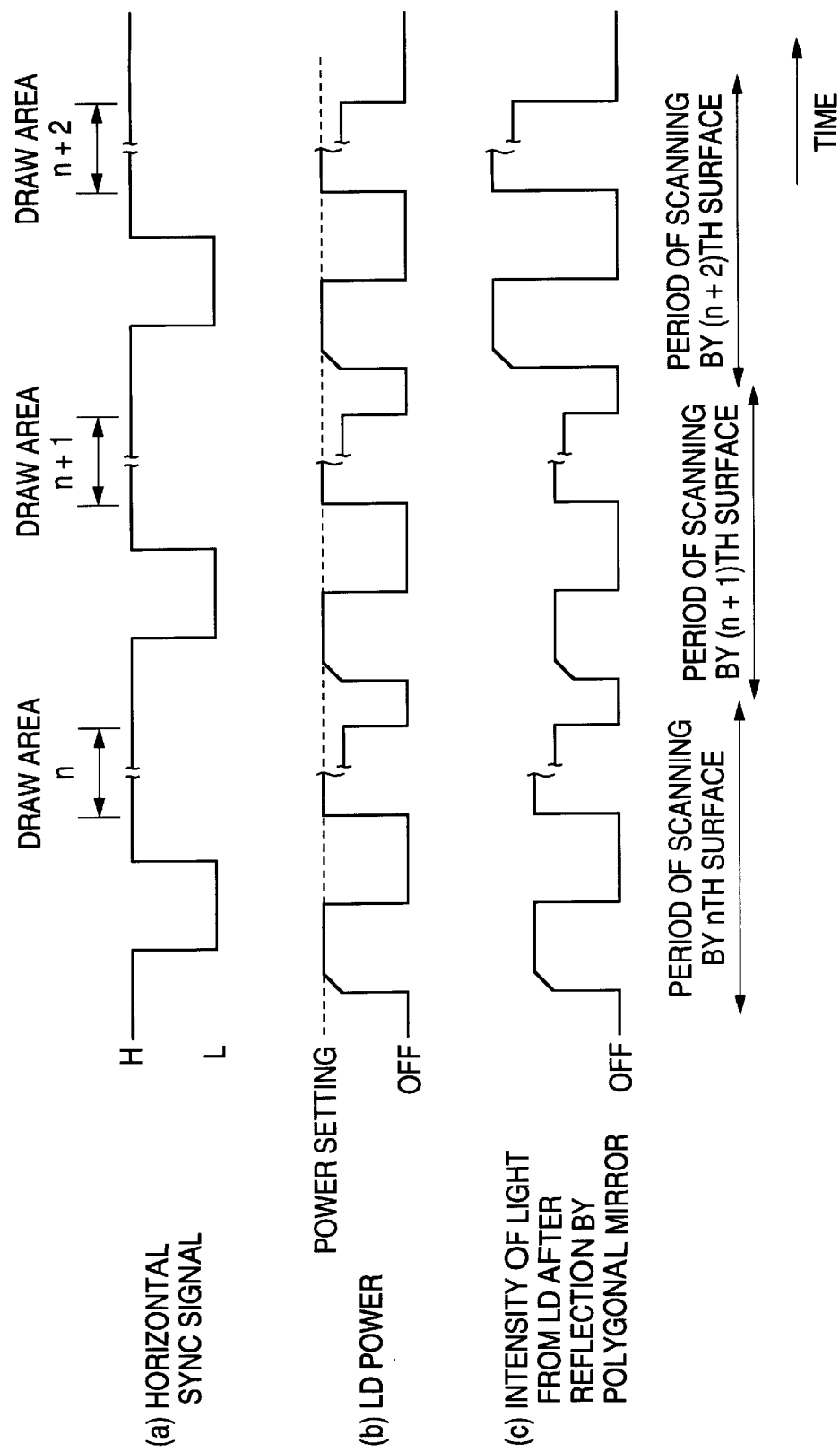

LASER SCAN BASED RECORDING APPARATUS

BACKGROUND OF THE INVENTION

The present invention relates to a laser scan based recording apparatus for use with laser printers and the like to record information using laser light to scan the photosensitive surface of a photoreceptor by a rotating polygonal mirror. The invention relates specifically to an apparatus for adjusting the optical intensity of laser light being applied to the photosensitive surface of the photoreceptor.

Laser scan based recording apparatus of the type contemplated by the invention are adapted to be such that laser light emitted from a laser light source is projected on a reflecting surface of a rotatably driven polygonal mirror. As the polygonal mirror revolves, the direction of the laser light reflected from the reflecting surfaces of the polygonal mirror is changed so as to scan the photosensitive surface of a photoreceptor with the reflected light, thereby drawing an image in lines. In order to attain a uniform image density, the optical intensity of the laser light issuing from the laser light source (the intensity is hereunder referred to as "laser power") must be controlled at a specified level. To this end, the intensity of the laser light issuing from the laser light source is detected and the laser power is controlled on the basis of the detected value. This technique is generally called "APC (automatic power control)" and its operational concept is shown in FIG. 4. The optical intensity of laser light emitted from a laser diode LD in a laser light s source 1 is detected with a monitoring photodiode PD. The resulting detection current Im is converted to voltage in I/V (current/voltage) converter 11, followed by comparison with a reference voltage Vref in a comparator 14. The resulting comparison output Vo is held in a sample and hold circuit SH, from which it is fed into a laser drive circuit 17 capable of V/I (voltage/current) convention. In the laser drive circuit 17, the current to drive the laser diode LD is controlled such that the laser power is controlled to a specified value, thereby controlling the optical intensity of the laser light being applied to a photoreceptor drum 7.

A problem with this approach of controlling the laser power to a specified level is that if the intensity of laser light varies due to various factors that occur in the optical path from the laser light source 1 to the photosensitive surface of the photoreceptor drum 7, it becomes difficult to ensure the desired uniform image density. One such factor is the variation in the reflectance of laser light from the individual reflecting surfaces of the polygonal mirror 4. If different reflecting surfaces produce different reflectances of laser light, the intensity of the laser light reflected from the successive reflecting faces also varies, causing differences in the densities of the scan lines created by the laser light reflected from the successive reflecting surfaces. The reflecting surfaces of the polygonal mirror 4 are initially designed to reflect the incident light at the same reflectance. However, as the polygonal mirror revolves at high speed, dust and other particles in air collect the reflecting surfaces. Because of this, and other reasons, the reflectance of laser light from each reflecting surface will vary over time, eventually causing variations of about 3 to 4% in the reflectances of laser light from the respective reflecting surfaces. Such variations in reflectance are not a big problem in binary level recording which forms an image by turning on and off the laser light. On the other hand, with color printers or the like which require the production of a halftone image, density control is necessary for providing at least 256 levels of contrast. To meet this need, the variation in the reflectance of laser light should not exceed 1%.

In order to deal with the problem of variation in the reflectance of laser light from each reflecting surface of the polygonal mirror, the detection of the intensity of laser light in the practice of APC may be performed in a position downstream of the polygonal mirror, preferably in the neighborhood of the photosensitive surface of the photoreceptor. In this way, the optical intensity of the laser light actually reflected by the polygonal mirror is detected and by controlling the laser power on the basis of the detection output. Uniformity can then be assured in the profile of laser light intensity on the photosensitive surface. For example, Unexamined Published Japanese Patent Application Nos. 37629/1988 and 162013/1992 propose a beam recording apparatus which detects the intensity of laser light just before it scans the photosensitive surface of a photoreceptor drum, and controls the laser power on the basis of the detected value of laser light intensity. More specifically, the optical intensity output of laser light is detected with a photosensor provided in the neighborhood of the photoreceptor drum. Its peak is held and fed back to an APC circuit, which uses the thus held sensor output to control the laser light modulator, as well as the semiconductor laser generator serving as the laser light source.

According to the technique just described above, the laser power control is solely based on the laser light intensity detected with the photosensor provided just ahead of the photoreceptor drum. This occasionally causes the following problem. Prior to the projection of laser light on the photosensor as in the initial sate or if the laser light fails to be projected on the photosensor due, for example, to vertical offset in laser scanning, the output of the photosensor is almost zero, so the APC circuit will control the laser power toward a maximum level. This causes the laser light source and the optical modulator to operate with a maximum level of laser power, as is typically the case of failure of the laser light to be projected on the photo-sensor. If the laser light source is continuously driven to produce a maximum power, the semiconductor laser generator may potentially break due to the overdrive. In the other case, the repeated variation in laser power from the maximum to a specified level eventually shortens the life of the semiconductor laser generator.

SUMMARY OF THE INVENTION

An object, therefore, of the present invention is to provide a laser scan based recording apparatus that is protected against the overdriving of a laser light source and the variation in laser power and which is capable of consistent and highly reliable operation.

The stated object of the invention is attained, for instance, by a laser scan based recording apparatus in which laser light emitted from a laser light source is reflected by a polygonal mirror to scan a photoreceptor. A first emission output control system defects the optical intensity of the laser light with a monitoring photodetector and control the optical intensity of the laser light on the basis of the resulting detection output. A second emission control system detects the optical intensity of the reflected laser light from the polygonal mirror with a photodetector and controls the intensity of the laser light on the basis of the resulting detection output. The first and second emission control systems are selectively operated by selective switching system.

The apparatus may further include a processing unit for performing timed control such that the laser light source is turned on both during the period; of scanning of the photoreceptor and during the immediately preceding emission output control period. The selective switching system is adapted to perform the selective operation during the emission output control period.

The selecting switching system normally selects the first emission output control system, but selects the second emission control system when a detection output is provided by the photodetector. As the selecting switching system, a switching transistor is preferably used to cope with high-speed switching operation.

The photodetector is preferably a sync signal generating photodetector for performing synchronous scanning with the laser light.

The present disclosure relates to the subject matter contained in Japanese patent application No. 8-298343 filed on Nov. 11, 1996 which is expressly incorporated herein by reference in its entirety.

BRIEF DESCRIPTION OF THE DRAWINGS

In the accompanying drawings

FIG. 5 is a timing chart describing the operation of APC by the APC circuit shown in FIG. 4.

DESCRIPTION OF THE LASER SCAN BASED RECORDING APPARATUS

Figure 1:
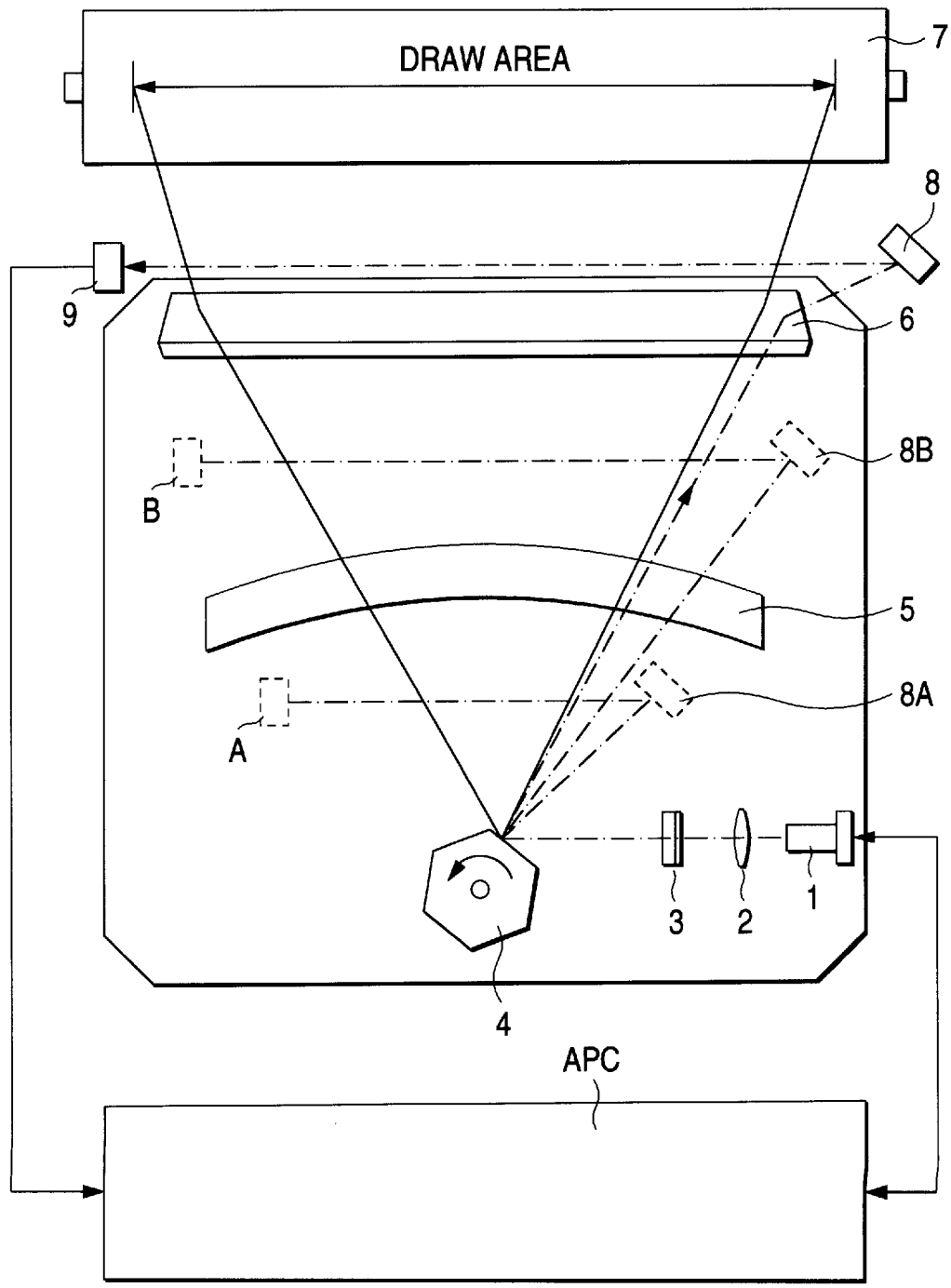
FIG. 1 is a diagram showing the design concept of a laser scan based recording apparatus.

FIG. 1 is a conceptual diagram showing the general layout of a laser scan based recording apparatus. A semiconductor laser 1 as a laser light source emits laser light. A collimator lens 2 produces a parallel beam of the laser light. A cylindrical lens 3 shapes the laser beam. Lenses 2 and 3 are disposed in the optical path of the laser light. The shaped laser beam is projected on a polygonal mirror 4. The polygonal mirror 4 is formed as an equilateral polygonal prism. Its lateral sides, which are six in the apparatus under consideration, are each provided with a reflector mirror. The polygonal mirror 4 is driven to rotate counterclockwise (as indicated by the arrow) rapidly about the central axis. The laser light reflected from the polygonal mirror 4 is transmitted through an fθ lens 5 with the direction of reflection being synchronous with the rotation of the polygonal mirror 4. The transmitted laser light is reflected by a reflector mirror 6 and projected on the photosensitive surface of a photoreceptor drum 7 such that it is scanned in the main scanning direction. The angular velocity of deflection of the reflected laser light is corrected by the fθ 5 to provide a uniform scan speed on the photoreceptor drum 7. The photoreceptor drum 7 is rotated about its own axis, thereby effecting auxiliary scan. In the apparatus under consideration, a reflector mirror 8 is provided outside the image drawing region of the photoreceptor drum 7 and in a position close to the end where scanning with the laser light starts. A photosensor 9 for detecting the optical intensity of the laser light reflected from the mirror 8 is provided in a position which is diametrically opposite to said mirror in the axial direction of the photoreceptor drum 7.

Figure 2:
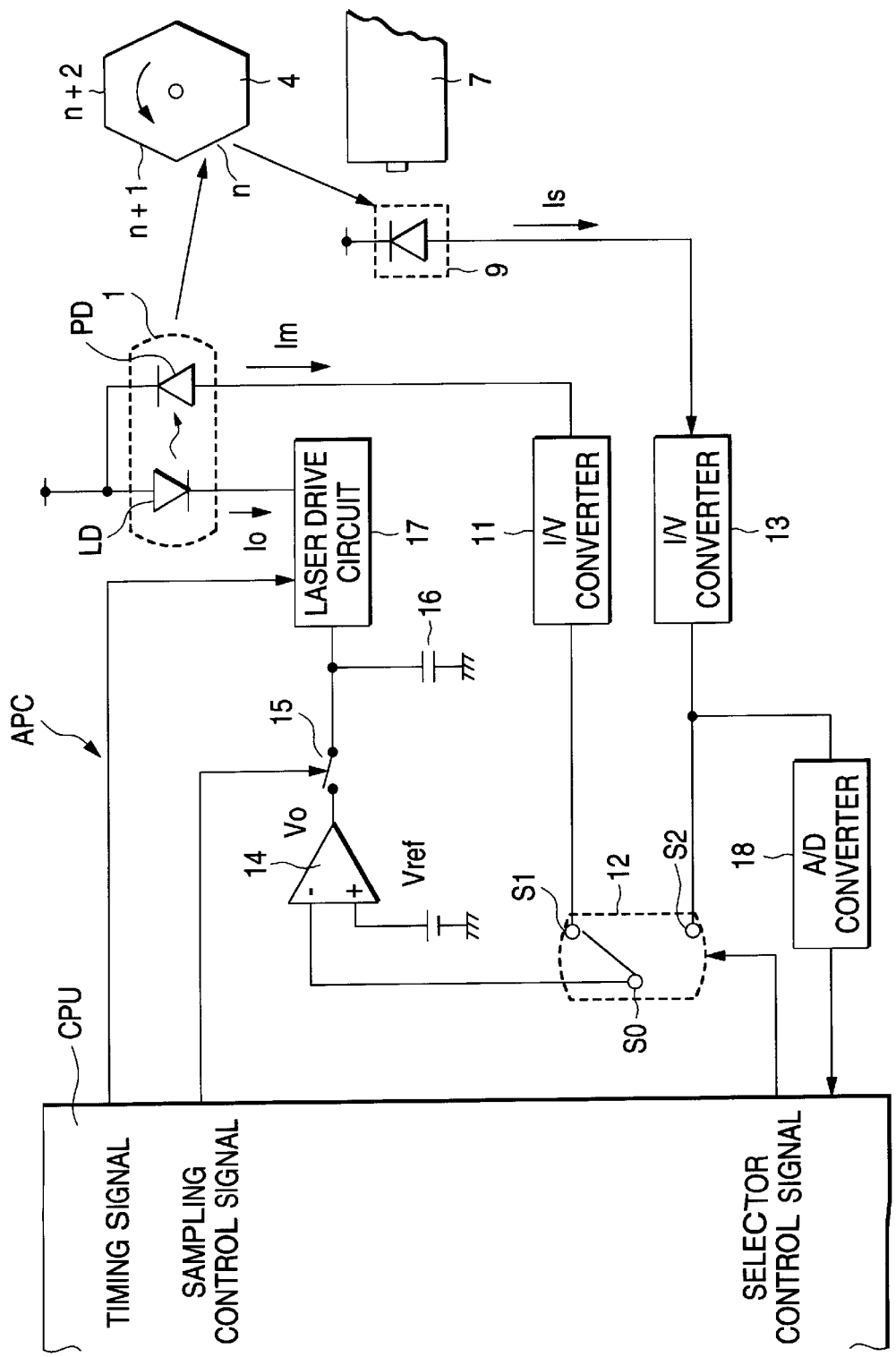
FIG. 2 is a circuit diagram showing the configuration of the APC circuit in the apparatus.

FIG. 2 shows the circuit configuration of the APC circuit APC provided in the laser scan based recording apparatus shown in FIG. 1. Those parts which have the counterparts in FIG. 1 are identified by like numerals. The semiconductor laser 1 is an integral assembly of the laser diode LD and the monitoring photodiode PD; the laser diode LD emits laser light which is projected on the polygonal mirror 4 and part of the projected laser light is received by the monitoring photodiode PD which detects its optical intensity. In general, the photodiode is located behind the lager diode LD, i.e. at a position opposite from the polygonal mirror 4 with respect to the laser diode LDr to receive the back laser light from the laser diode LD. The detection current Im for the laser light detected by the photodiode PD is converted to voltage by an I/V (current/voltage) converter 11 and delivered to the first switching end S1 of a selector 12 (details of which will be given later). In the apparatus under consideration, the photosensor 9 provided near the photoreceptor drum 7 is made of a photodiode of an independent configuration. The detection current Is for the laser light detected by the photodiode 9 is converted to a voltage signal by an I/V converter 13 and delivered to the second switching end S2 of the selector 12. The conversion coefficients of the I/V converters 11 and 13 are so set that they will produce equal output voltages when the output from the monitoring photodiode PD indicative of the optical intensity of the laser light emitted from the laser diode LD has a predetermined constant ratio relative to the output from the photodiode 9 indicative of the optical intensity of the laser light reflected by the polygonal mirror 4. That is to say, if no abnormal deterioration in the optical intensity occurs on an optical path from the laser diode LD through the polygonal mirror 4 to the photosensor 9, the converters 11 and 13 produce equal output voltage. The selection end SO of the selector 12 is connected to one input end of a comparator 14, in which voltage selected by the selector 12 is compared with a reference voltage Vref to the other input end of the comparator, which outputs a comparison voltage Vo. The output end of the comparator 14 is connected to a sampling switch 15 which, in turn, is connected to a holding capacitor 16. The comparison voltage sampled by the holding capacitor 16 is fed into a laser drive circuit 17 having a V/I (voltage/current) converting capability. The drive circuit 17 outputs a drive current Io which activates the laser diode LD for light emission, with its laser power controlled.

The APC circuit is also provided with a control processing unit CPU for controlling the selector 12 and the sampling switch 15. Part of the voltage signal obtained by I/V conversion of the detection current Is detected by the photosensor 9 is digitized by an A/D converter 18 and fed into the CPU. In response to the signal from the photosensor 9, the CPU is capable of outputting the following three signals; a selector control signal for selective operation of the selector 12, a sampling control signal for performing ON-OFF control on the sampling switch 15, and a timing signal for controlling the timing of the supply of a drive signal from the laser drive circuit 17 to the laser diode LD to form an image on an image draw area of the photoreceptor drum 7.

The operation of the APC circuit having this configuration is now described with reference to the timing chart shown in FIG. 3. The following description assumes that among the six reflecting surfaces of the polygonal mirror 6, three adjacent surfaces, nth, (n+1)th and (n+2)th have light reflectances R(n), R(n+1) and R(n+2), respectively, which satisfy the relation R(n+1)<R(n)<R(n+2). Therefore, if the laser power of the laser diode LD, namely, the intensity of the laser light emitted from the laser diode LD is constant, the intensities of laser light reflected by those surfaces, P(n+1), P(n) and P(n+2), increase in that order, causing uneven densities on the photoreceptor drum 7.

In synchronism with the rotating cycle of the polygonal mirror 4 and in response to the timing signal, the central processing unit CPU controls the laser drive circuit 17 such that the laser diode LD emits laser light both at the scan timing for the scanning of the photoreceptor drum 7 with the laser light and at the APC timing for adjusting the laser power of the laser diode LD immediately before the scan timing. The laser light issuing from the laser diode LD is collimated by the collimator lens 2, shaped by the cylindrical lens 3, reflected by the polygonal mirror 4, passed through the fθ lens 5, and is reflected by the reflecting mirror 6 to scan the photoreceptor drum 7 in the main scanning direction.

At the APC timing for adjusting the laser power of the laser diode, the laser light emitted from the laser diode LD is first detected by the monitoring photodiode PD. The resulting detection current Im is converted to voltage in the I/V converter 11 and fed to the first switching end S1 or the selector 12. Since the selector 12 normally has the selection end S0 connected to the first switching end S1, the voltage of the detection current Im from the monitoring photodiode PD is fed to the comparator 14, where it is compared with the reference voltage Vref to output the comparison voltage Vo. When at the APC timing the sampling switch 15 is turned on in response to the sampling control signal from the central processing unit CPU, the comparison voltage Vo is sampled by charging and discharging the holding capacitor 16 and fed to the laser drive circuit 17, which controls the drive current to the laser diode LD in accordance with the comparison voltage output. In this manner, a first feedback control is carried out for the laser diode LD to produce a laser power in accordance with the reference voltage Vref.

Thereafter, when the photosensor 9 receives the laser light reflected by the polygonal mirror 4, a second feed back control is carried out as follows. The laser light reflected by the polygonal mirror 4 is detected with the photosensor 9 right before the laser light scans the photoreceptor drum 7. The detection voltage shown as "photosensor output" indicated by (b) in FIG. 3 is A/D converted and fed to the central processing unit CPU. The CPU processes the detection output from the photosensor 9 as a timing signal for providing synchronization in the main scanning direction, outputs a sync signal as shown by (a) in FIG. 3, and executes the timing control of laser scanning. The producer of this timing control is well known and need not be described in detail. In response to the detection output from the photosensor 9, the central processing unit CPU outputs a "selector control signal" as shown by (f) in FIG. 3. In response to the selector control signal, the selection end SO of the selector 12 is connected to the second switching end S2. The voltage detected by the photosensor 9 is fed to the comparator 14, which compares the detection voltage with the reference voltage Vref and outputs comparison voltage Vo. Since the sampling control keeps the sampling switch 15 in the ON state as shown by (e) in FIG. 3, the comparison voltage Vo is sampled in the holding capacitor 16 and fed to the laser drive circuit 17. As a result, the laser drive circuit 17 performs the second feedback control in accordance with the detection voltage from the photosensor 9, thereby controlling the laser power of the laser diode LD.

After the first and second feed back controls are carried outs the holding capacitor 16 holds the comparison voltage Vo by which the laser power of the laser diode LD is maintained through the laser drive circuit 17 during the scanning of the photoreceptor drum 7 to create an image on one raster line. In addition, since the scanning of the photoreceptor drum 7 on one raster line is generally carried out at extremely high speed, the holding capacitor 16 holds the comparison voltage $V_O$ during the scanning of the photoreceptor drum 7 on one raster line.

As will be understood from the above description, if the optical intensity of the light reflected from each of the reflecting surfaces of the polygonal mirror varies due to the difference in the reflectance of light between individual reflecting surfaces despite the constant optical intensity of the laser light emitted from the laser diode LD, the decrease or increase in the optical intensity of the reflected light from each reflecting surface causes the detection voltage from the photosensor 9 to become lower or higher than the reference voltage. The central processing unit CPU controls the laser power of the lower diode LD in such a way as to eliminate the change, to ensure that the detection voltage from the photosensor 9 satisfies a specified relationship with the reference voltage Vref. Thus, even if the reflectance of laser light from each reflecting surface of the polygonal mirror 4 has varied, the laser power of the laser diode LD is controlled in accordance with the respective reflectances and the optical intensity of laser light reflected from each reflecting surface of the polygonal mirror 4 will be controlled to a specified optical intensity which is set on the basis of the reference voltage Vref.

Prior to the scan timing, the sampling control signal turns off the sampling switch 15. The selector control signal causes the selection end S0 of the selector 12 to be reconnected to the first switching end S1 so that the system is ready for the next cycle of APC. Therefore, during the scan timing, the laser diode LD emits laser light while maintaining the laser power which is set on the basis of the detection signal from the photosensor 9 and the emitted laser light scans the photoreceptor drum 7 to execute image drawing.

Figure 3:
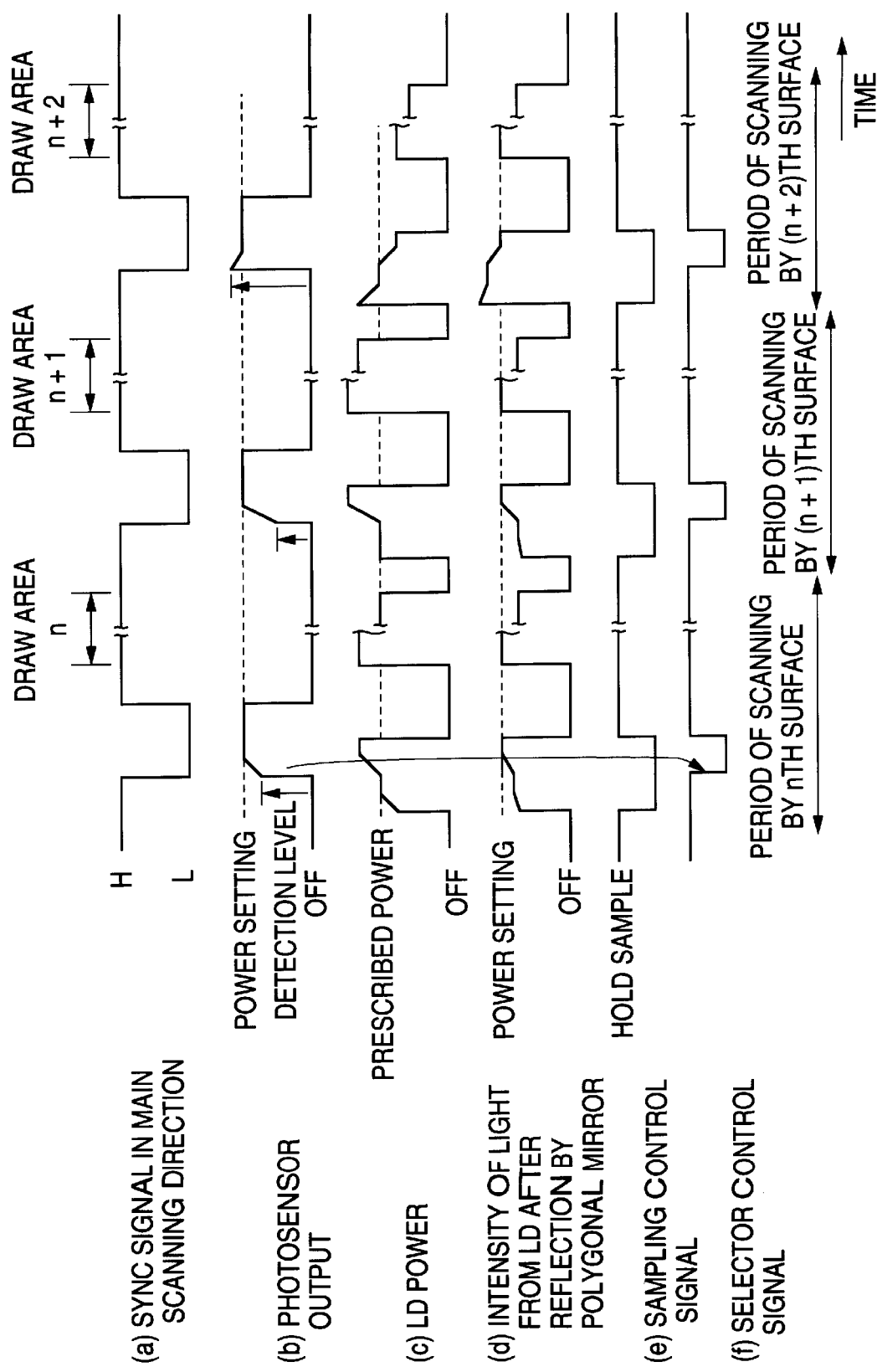
FIG. 3 is a timing chart describing the operation of APC by the apparatus.

Stated more specifically, if the reflectance R(n) of laser light from the nth reflecting surface of the polygonal mirror 4 is somewhat lower than the required level so that the optical intensity of the laser light reflected by that surface is lower than the reference as shown by (d) in FIG. 3, the level of the detection signal from the photosensor 9 decreases accordingly as shown by (b) in FIG. 3. This increases the value of comparison output Vo, whereupon the laser drive circuit 17 controls the laser diode LD to produce an increased laser power as shown by (c) in FIG. 3. When the laser power is increased, the optical intensity of laser light reflected from the polygonal mirror 4 is also increased as shown by (d) in FIG. 3, whereupon a specified level of laser light intensity is attained on the surface of the photoreceptor drum 7. Similarly, if the reflectance R(n+1) of laser light from the (n+1)th reflecting surface is even lower than the required level, the came control is performed as with the aforementioned nth surface, and the laser light intensity on the photoreceptor drum 7 is further increased to attain the specified level. Conversely, if the reflectance R(n+2) of laser light from the (n+2)th reflecting surface is higher than the required level so that the optical intensity of the laser in light reflected by that surface is higher than the reference, the level of the detection signal from the photosensor 9 increases accordingly. This reduces the value of comparison output Vo, whereupon the laser drive circuit 17 controls the laser diode LD to produce a reduced laser power. As a result, the optical intensity of the laser light reflected from the polygonal mirror 4 is reduced, causing the laser light intensity to attain the specified level on the surface of the photoreceptor drum 7.

Figure 4:
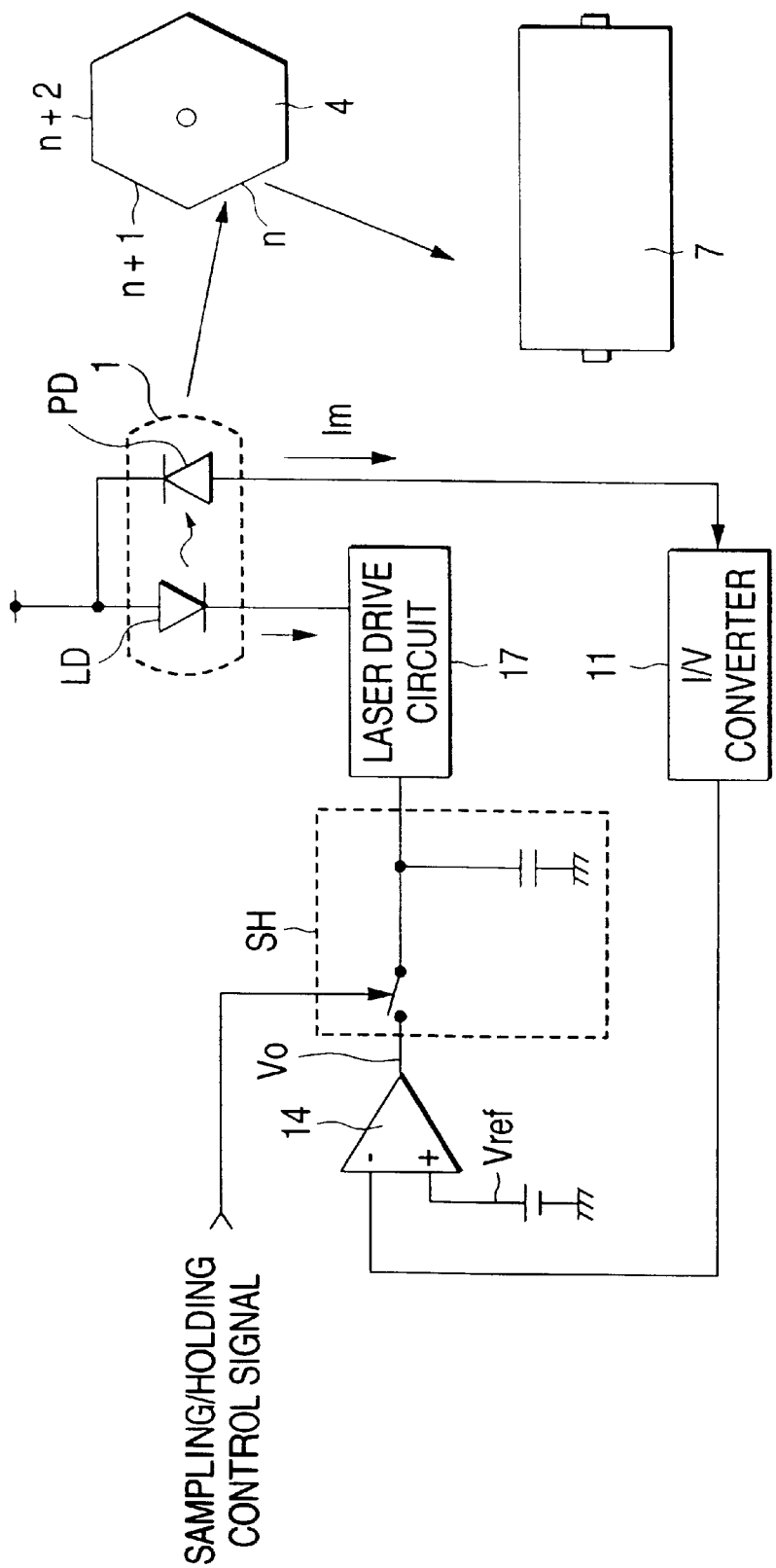
FIG. 4 is a circuit diagram of the exemplified APC circuit.

Thus, the laser power is controlled momentarily in accordance with the optical intensity of the laser light detected with the photosensor 9. Despite the variation in the reflectance of laser light from each reflecting surface of the polygonal mirror 4, the optical intensity of laser light at each of the scan or raster lines on the photoreceptor drum 7 can be controlled at a specified level to produce uniform image density at each scan line and realize the drawing of a high-quality image. In this connection, it is interesting to refer to FIG. 5 which is a timing chart describing the control of laser power by the APC circuit shown in FIG. 4. Obviously, the laser power of the laser diode LD can be controlled at a constant level, however, due to the variation in the reflectance of laser light from each reflecting surface of the polygonal mirror 4, there occurs a corresponding variation in the optical intensity of the laser light scanning the surface of the photoreceptor drum 7. The resulting variation in density between individual scan lines makes it difficult to achieve image drawing at uniform density.

Thus, in the apparatus described above, the laser power is controlled utilizing the photosensor 9 which detects the optical intensity of the laser light reflected from the polygonal mirror 4. In addition, at the early phase of APC timing, the laser power is controlled on the basis of the optical intensity as detected with the monitoring photodiode PD. Even in the initial period of scanning operation, or if the laser light fails to be launched into the photosensor 9 due to vertical offset in scanning (namely), even in the case where the detection output from the photosensor 9 is zero to thereby produce an extremely high comparison output), the laser power can be controlled solely on the basis of the comparison output which is held in the holding capacitor 16 immediately before the second feedback control is effected. This prevents the laser power from being overdriven. As a result, it is possible to provide protection not only against the breakage lo of the laser diode due to the overdrive of laser power, but also against the shortening of its life due to the great variation in the laser power.

In the apparatus described above, the photosensor 9 is located near the photoreceptor drum 7, and is also intended to serve as a synchronous detecting optical sensor for generating sync signals in the main scanning direction in the central processing unit CPU. Instead of this arrangement, a separate synchronous detecting optical sensor may be provided in addition to the photosensor 9. All that is required of the photosensor 9 is that is should be capable of detecting laser light after it was reflected by the polygonal mirror 4 but before it scans the surface of the photoreceptor drum 7; hence, it goes without saying that the photosensor 9 may be provided at point A (indicated by a dashed line in FIG. 1) which is ahead of the fθ lens 5 or at point B (also indicated by a dashed line) which is ahead of the reflector mirror 6 and a reflector mirror 8A (or 8B) is provided in a position diametrically opposite to the photosensor such that the laser light reflected from the mirror 8A (or 8B) is detected by the photosensor 9. If desired, the photosensor 9 may be provided in tho position of reflector mirror 2 (or 8A or 8B) to receive the laser light directly. It should, however, be noted that the use of the reflector mirror provides an increased latitude in the space for installing the photosensor.

As described on the foregoing pages, the laser scan based recording apparatus includes a first emission output control unit for detecting the optical intensity of the laser light from a laser light source with a monitoring photodetector and controlling the emission output of the laser light source and a second emission unit for detecting the optical intensity of the reflected laser light from a polygonal mirror with a photosensor and controlling the emission output of the laser light source. The first and second emission output control unit are selectively operated by the selective switching unit to perform APC. Because of this design, the optical intensity of the laser light reflected from th polygonal mirror can be controlled at a specified level and the variation in optical intensity among a plurality of scan lines on the photoreceptor is effectively eliminated to provide uniform image density, thereby realizing the drawing of high-quality images. In addition, if the photosensor is not illuminated with laser light, the laser power is subjected to positive APC by the monitoring photodiode so that the overdrive of the laser diode is effectively prevented to protect it against breakdown and realize consistent and highly reliable laser power control.

What is claimed is:

1. A laser scan based recording apparatus in which laser light emitted from a laser light source is reflected by a polygonal mirror to scan a photoreceptor, said apparatus comprising:

a first emission output control system which detects an optical intensity of said laser light by a monitoring first photodetector and controls the optical intensity of said laser light on the basis of an output of said first emission output control system;

a second emission output control system which detects an optical intensity of the reflected laser light from said polygonal mirror with a second photodetector and controls the intensity of said laser light on the basis of an output of said second emission output control system; and a selective switching system for selectively operating said first and second emission output control systems.

2. The laser scan based recording apparatus according to claim 1, wherein said first photodetector is integral with the laser light source.

3. The laser scan based recording apparatus according to claim 1, further comprising:

a processing unit for performing timed control to activate the laser light source both during a period of scanning of the photoreceptor and during an immediately preceding emission output control period, and wherein said selective switching system selects one of said first and second emission output control systems during said emission output control period.

4. The laser scan based recording apparatus according to claim 3, wherein the selective switching system normally selects the first emission output control system, but selects the second emission output control system when a detection output is provided by the second photodetector.

5. The laser scan based recording apparatus according to claim 1, wherein the second photodetector is used also as a sync signal generating photodetector for performing synchronous scanning with the laser light.

6. The laser scan based recording apparatus according to claim 1, wherein said first and second emission output control systems have a common comparator selectively connected to one of said first and second photodetectors by said selective switching system.

7. The laser scan based recording apparatus according to claim 6, wherein said first and second emission output control systems have a common laser drive circuit which receives an output from said comparator to control the laser light source.

8. The laser scan based recording apparatus according to claim 7, wherein a holding capacitor is provided between said comparator and said laser drive circuit, to hold an output of said comparator when the laser light reflected by the polygonal mirror scans the photoreceptor on one raster line.

9. The laser scan based recording apparatus is according to claim as wherein said selective switching system selects said first emission output control system before the second photodetector receives the reflected laser light from said polygonal mirror, and said second emission output control system after the second photodetector receives the reflected laser light from said polygonal mirror.

10. A laser scan based recording apparatus comprising:

a laser diode having an integral monitoring photodiode;

a laser output control circuit which controls an emission output of said laser diode;

a rotatably driven polygonal mirror having a plurality of reflecting surfaces which directs the laser light emitted from said laser diode to scan a photoreceptor;

a photosensor detecting laser light reflected from said polygonal mirror;

a selector which selects one of an output of said monitoring photodiode and an output of said photosensor;

a comparator which compares the selected output with a reference voltage so as to produce an error signal;

a sample and hold circuit which samples and holds said error signal to provide a control input to said laser output control circuit; and a processing unit which controls a timing of selection of said selector and a timing of sampling and holding of said sample and hold circuit.

11. The laser scan based recording apparatus according to claim 10, further comprising:

an fθ lens correcting a scan speed of the laser light reflected from the polygonal mirror; and a reflector mirror reflecting the corrected laser light toward the photoreceptor, wherein the photosensor is located on one of a side of said of said fθ lens, a side of the reflector mirror and a side of the photoreceptor, such that said photosensor is positioned outside a scanning region of the photoreceptor in proximity to a scan start point.

12. A process for adjusting optical intensity of a laser beam emitted onto a photoreceptor by using a n-th surface of a rotating polygonal mirror to draw an image on one raster line of the photoreceptor, said process comprising:

emitting the laser beam onto the n-th surface of the rotating polygonal mirror;

carrying out a first feedback control by comparing an output from a first photodetector which detects an optical intensity of the laser beam with a reference value using a comparator;

switching the comparator to receive, instead of an output from the first photodetector, an output from a second photodetector which detects an optical intensity of the laser beam reflected by the n-th surface after the first feedback control has been carried out and before the laser beam reflected by the n-th surface, where n is a positive integer, reaches an image draw area of the photoreceptor; and feedback control by comparing the output from the second photodetector with the reference value using the comparator.

13. A process according to claim 12, further comprising:

emitting the laser beam on the image draw area of the photoreceptor while maintaining optical intensity of the laser beam controlled and set through the second feedback control after the second feedback control has been carried out.

14. A process according to claim 12, wherein said first feedback control starts in response to a sampling control signal.

15. A process according to claim 14, wherein said second feedback control starts in response to a selector control signal.

* * * * *